US009213531B2

(12) United States Patent
Tallam et al.

(10) Patent No.: US 9,213,531 B2
(45) Date of Patent: Dec. 15, 2015

(54) METHODS TO ELIMINATE EXTRA MEMORY LOADS WHILE ACCESSING GLOBAL VARIABLES IN POSITION INDEPENDENT CODE

(71) Applicant: Google Inc., Mountain View, CA (US)

(72) Inventors: Sriraman Tallam, Mountain View, CA (US); Xinliang David Li, Mountain View, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

(21) Appl. No.: 14/267,705

(22) Filed: May 1, 2014

(65) Prior Publication Data

US 2015/0317139 A1      Nov. 5, 2015

(51) Int. Cl.
G06F 9/44 (2006.01)
G06F 9/45 (2006.01)

(52) U.S. Cl.
CPC .................................. *G06F 8/4434* (2013.01)

(58) Field of Classification Search
USPC .................. 717/140–144, 150–152, 158–160
See application file for complete search history.

(56) References Cited

U.S. PATENT DOCUMENTS

| | | | | |
|---|---|---|---|---|
| 5,704,053 A * | 12/1997 | Santhanam | .................... | 717/158 |
| 5,923,882 A * | 7/1999 | Ho et al. | ........................ | 717/147 |
| 5,940,621 A * | 8/1999 | Caldwell | ....................... | 717/156 |
| 6,735,758 B1 * | 5/2004 | Berry et al. | .................... | 717/130 |
| 7,237,234 B2 * | 6/2007 | Granston et al. | .............. | 717/151 |
| 7,530,059 B2 * | 5/2009 | Kielstra et al. | ................. | 717/148 |
| 7,627,861 B2 * | 12/2009 | Smith et al. | .................... | 717/144 |
| 7,849,453 B2 * | 12/2010 | Tirumalai et al. | ............. | 717/160 |
| 8,056,064 B2 * | 11/2011 | Moudgill et al. | ............. | 717/151 |
| 8,087,010 B2 * | 12/2011 | Eichenberger et al. | ....... | 717/150 |
| 8,239,841 B2 * | 8/2012 | Chen et al. | .................... | 717/140 |
| 8,499,291 B2 * | 7/2013 | Wu et al. | ....................... | 717/140 |
| 8,869,127 B2 * | 10/2014 | Dolby et al. | ................. | 717/151 |
| 8,997,071 B2 * | 3/2015 | Chen et al. | .................... | 717/149 |
| 9,009,689 B2 * | 4/2015 | Krishnaiyer et al. | ......... | 717/151 |

OTHER PUBLICATIONS

Bronevetsky et al, "Compiler-Enhanced Incremental Checkpointing for OpenMP Applications", ACM, pp. 275-276, 2008.*
Lee et al, "Enhanced Hot Spot Detection Heuristics for Embedded Java Just-in-Time Compilers", ACM, pp. 13-22, 2008.*

(Continued)

*Primary Examiner* — Anil Khatri
(74) *Attorney, Agent, or Firm* — Birch, Stewart, Kolasch & Birch, LLP

(57) ABSTRACT

Methods for reducing memory loads for accessing global variables (globals) when creating executables for position independent (PI) code are disclosed. A first method includes compiling PI code, identifying globals, and determining whether globals are defined in the executable. If a global is not defined in the executable, a definition is created in the executable. A second method includes receiving a list of defined globals from instrumented PI code binary and comparing the list with globals in the PI code. Memory loads are created for globals that are unlisted. A third method includes compiling PI code with special relocations for globals and determining whether globals are defined in the executable. If the global is defined in the executable, the special relocation is replaced with a direct load of the global. If not, the special relocation is replaced with a two-instruction sequence that loads the global's address and then the global's value.

5 Claims, 10 Drawing Sheets

(56) References Cited

OTHER PUBLICATIONS

Denny et al, "Enhancing Syntax Error Messages Appears Ineffectual", ACM, pp. 273-278, 2014.*

Hoflehner et al, "Compiler Optimizations for Transaction Processing Workloads on Itanium® Linux Systems", IEEE, pp. 1-10, 2004.*

Tilevich et al, "Program, Enhance Thyself!—Demand-Driven Pattern-Oriented Program Enhancement", ACM, pp. 13-24, 2008.*

International Search Report and Written Opinion for International Application No. PCT/US2015/024701 dated Jun. 23, 2015.

* cited by examiner

```
        a.cc
        ====
101a  ─┤ extern int glob_a;

int main ()
        {
                return glob_a;
        } b.cc
102a  ─┤ ====
        int glob_a = 5;
```

FIG. 1a

```
        a.cc
        ====
101b  ─┤ extern int glob_a;

int main ()
        {
                return glob_a;
        } shared.cc
102b  ─┤ ====
        int glob_a = 5;
```

FIG. 1b

```
foo.cc
====== extern int a_glob;

int main()
{
return a_glob;
}

(301)
```

```
4005e0 <main>:
......
 mov   0x1622(%rip),%eax (302)
```

```
6f0 <main>:
 mov   0x1609(%rip),%rax
 mov   (%rax),%eax (303)
```

FIG. 3

```
foo.cc
===== int glob_a;
extern int glob_shared;
extern int glob_b;

int main ()
{
.... (access globals)
}
```

From, the instrumented binary:

defined in the executable:
------------------
glob_a
glob_b
------------------ defined in a shared object:
------------------
glob_shared
------------------

FIG. 7

```
<main>:
......
 mov   0x1684(%rip),%eax (903)
```

```
foo.cc
====== extern int a_glob;

int main()
{
return a_glob;
}

(901)
```

```
<main>:
 mov   0x1609(%rip),%rax
 mov   (%rax),%eax (904)
```

```
<main>:
......
 mov   GLOBAL_ACCESS(a_glob),%eax (902)
```

FIG. 9

METHODS TO ELIMINATE EXTRA MEMORY LOADS WHILE ACCESSING GLOBAL VARIABLES IN POSITION INDEPENDENT CODE

BACKGROUND

Many C/C++ binaries are compiled to be position dependent, which means that each binary is built to be loaded into, and executed from, a particular address or virtual address in memory. The addresses or virtual addresses of functions and global variables are the same on every invocation of a position-dependent binary. However, this position-dependence exposes a binary to security risks. To avoid these security risks, binaries are created which are position independent.

Position independent binaries can be loaded into different virtual address ranges on every invocation. This technique is known as address space layout randomization (ASLR) and can stop many security attacks that depend on knowing the address of a function, symbol, or variable in a particular binary. However, creating position independent binaries may cause non-trivial performance issues. Using conventional position independence techniques to compile binaries requires extra memory load operations when accessing global variables. These extra memory loads may cause performance deteriorations in binary executions.

As recognized by the inventors, there should be compilation techniques that reduce the number of memory loads required to access global variables when creating executable binaries for position independent code.

SUMMARY

This specification describes technologies relating to binary creation in general, and specifically to methods and systems for reducing the number of memory loads required to access global variables when creating executable binaries for position independent code.

In general, one aspect of the subject matter described in this specification can be embodied in systems and methods for reducing the number of memory loads required to access global variables when creating an executable binary for position independent code. An example system includes one or more processing devices and one or more storage devices storing instructions that, when executed by the one or more processing devices, cause the one or more processing devices to execute an example method. An example method includes: compiling the position independent code to create an executable binary without creating memory load instructions for obtaining global variable addresses; identifying a global variable within the position independent code; determining whether the global variable is defined in the executable binary; and responsive to determining that the global variable is not defined in the executable binary: creating a definition for the global variable in the executable binary reducing the need to load the global variable's address from memory; and providing the created definition for the global variable to a shared object or library.

A second example method for reducing the number of memory loads required to access global variables when creating an executable binary for position independent code includes: receiving a list of defined global variables from an instrumented binary of the position independent code, the list of defined global variables containing global variables that are defined in the instrumented binary; and compiling the position independent code to create an executable binary by: comparing the list of defined global variables with global variables in the position independent code and creating a memory load to load addresses of global variables from the global offset table for only the global variables that are not in the list of defined global variables.

A third example method for reducing the number of memory loads required to access global variable values when creating an executable binary for position independent code includes: compiling the position independent code, which includes a static relocation as a memory instruction placeholder for a global variable, to create an executable binary; determining whether the global variable is defined in the executable binary; and responsive to determining that the global variable is defined in the executable binary, replacing the static relocation with a load instruction to directly load the global variable from the address of the global variable.

These and other embodiments can optionally include one or more of the following features: a load instruction may be a JUMP instruction to jump to the memory load instruction that will load the global variable's content and responsive to determining that a global variable is not defined in the executable, a static relocation may be replaced with a two-instruction sequence that loads the address of the global variable from the global offset table and then access the global variable's value by loading from the global variable's address.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 1a is example code illustrating a type of global variable.

FIG. 1b is example code illustrating a type of global variable.

FIG. 3 is example code illustrating an instruction sequence generated by a conventional compiler for position independent code adding a memory load for acquiring a global variable's address from a global offset table.

FIG. 7 is example code illustrating a list of defined global variables from an instrumented binary of the position independent code.

FIG. 9 is example code illustrating relocation markers.

DETAILED DESCRIPTION

Figure 2:
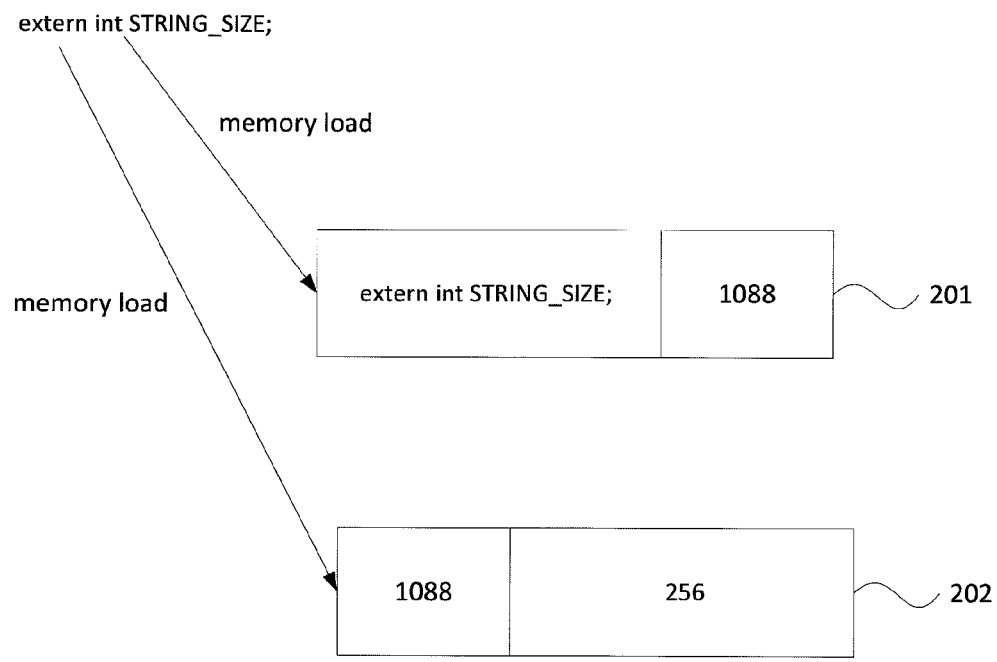
FIG. 2 is a block diagram illustrating conventional memory loads for obtaining a global variable.

According to an example embodiment, the performance of a position independent executable can be improved by reducing the number of memory loads generated by a compiler when accessing global variables.

A software program may be composed of two parts: the main executable and a set of shared libraries. A global variable referenced in the program can either be defined in the main executable or in a shared library (or shared object). If the global variable is defined in a shared library or object, it must be referenced through a global offset table because at compile time (when the source code is compiled) and link time (when the output of one or more compiled files are joined together), the address of the variable is not yet known. If there are two copies of the same variable, with one defined in the main executable and one defined in a shared library (or object), the definition in the main executable may be selected and the variable does not need to be referenced through the global offset table. However, in source code, there is no way to discern whether a global variable's definition will come from the main executable or from a shared library (or object) at compile time.

FIG. 1a illustrates an example of a global variable that will be defined in a main executable. A compiler compiles source code one source file at a time. In this example, a compiler will compile both a.cc and b.cc. When a compiler is compiling a source file, the compiler has no visibility into other files. Therefore, the compiler does not know that "glob_a" is defined in b.cc when the compiler is compiling a.cc. Instead, the compiler generates extra memory loads to load the contents/value of "glob_a" since the compiler cannot tell whether a global variable is defined elsewhere in the executable. A first memory load is created to obtain the address of a global variable from a global offset table (GOT) and a second memory load is created to obtain the contents that exist at that address, which is the value of the global variable. A linker, which a build tool that at link time stitches together one or more compiled files, looks at all compiled source files and joins the files to create an executable. Therefore, the linker can clearly tell whether the executable defines a specific global variable. If a copy of the global variable is created in the main executable, in an example system, the executable may avoid looking up the global variable in the GOT since the executable can use its copy of the variable instead.

In FIG. 1b a global variable is defined in a shared library that is built into a shared object. When a.cc is compiled into an executable, the executable does not define the global variable, "glob_a," but the shared library which is build and linked into a shared object defines the global variable. The main executable is then linked to the shared object to use the definition of "glob_a." For reference to a variable that the main executable does not have a copy, the global offset table is still needed.

When creating a position independent executable binary, at least two memory loads are required to obtain the value of a global variable using conventional techniques. As shown in FIG. 2, a first memory load obtains the address of a global variable from a global offset table (GOT) (201) and a second memory load obtains the contents that exist at that address (202), which is the value of the global variable. Conventional techniques require two memory loads for global variables in an executable even though global variables can have their contents directly loaded without requiring that their addresses be obtained.

With position independent code, the exact virtual address of any global variables, even those defined by the executable, is not known until the executable is loaded for execution. If the address of a global variable is known, the variable is not position independent. However, for a global variable defined by the executable, the offset of the global variable from its access point is always fixed. If a function "foo" accesses a global variable "glob_a" defined in the executable, the difference between the address of "glob_a" and the address of "foo" will be a constant and the offset may be known at link-time. The address of the global variable may be computed by adding the program counter or instruction address of the instruction immediately following the access point of the global to a given offset. The linker may specify the offset and the address may be right at run-time no matter where the executable is loaded.

When a compiler is compiling a source file with a global variable, the compiler does not know if the global variable will be defined in the executable binary or in a shared library. Conventional techniques conservatively add a memory access instruction for each global variable during compile time for global variables not defined in the current source module (file) being compiled for position independent code in case the address of a global variable needs to be loaded from the global offset table. FIG. 3 shows a global variable, "a_glob" being returned in a source file, "foo.cc" (301). In this example, "a_glob" may be defined in source file, "bar.cc" and the definition may be linked into the executable so that the variable is eventually defined in the executable. For position dependent optimized code accessing the global variable, the address of the function, "main," may be 0x4005e0 as shown in FIG. 3 (302). The global variable may be at offset 0x1622 bytes from the end of this instruction. The move instruction means that 0x1622 is added to the PC(rip) of the next instruction and the contents of the address are loaded to register eax. For position independent optimized code accessing the global variable, the exact address of the main function may not be known, but it can be defined at 0x6f0 bytes from the initial address of the executable. The GOT entry for the global variable is at offset 0x1609 bytes from the end of the first instruction. The first instruction may load the contents of that entry which is the address of the global variable. The address may be loaded to register rax. The second instruction may access the contents of the address loaded into register rax and store the result, which is the value of the global variable, back into rax.

At link time, when the output of one or more compiled files are joined together, a compiler tool will know where each global variable is defined since the link process sees all the object files generated by the compiler from the source files and knows where global variables are defined. Therefore, it can be determined whether an extra memory load will be required to obtain a global variable's value at link time. However, at this point in the process, it is too late to remove extra memory accesses even though an extra memory load is not required for global variables that are defined in the executable since the compiler has already added the instructions for the extra memory load and the linker does not have the ability to make major modifications to instructions or remove instructions added by the compiler. The linker can only modify instructions according to the semantics of the associated relocation entry for the instruction.

Annotating global variables in the source code is one conventional technique to prevent unnecessary memory loads. The global variables may be annotated as to whether they are defined in a shared object or in an executable. However, this annotation makes the code less flexible in regards to the way it can be built and also causes code maintenance problems.

In order to prevent unnecessary memory loads, an example compiler tool may use one of several example techniques. In one embodiment, a linker may create definitions in the executable for global variables that are not defined by the executable. As discussed above, a linker is a build tool that at link time stitches together one or more compiled files. The link step is invoked by providing a list of object files generated by the compiler (from compiling the source files) and a set of shared objects that the executable should reference. The linker puts these object files together to form the executable. As part of this linking step, the linker resolves references to any global variable. If a global variable is accessed by an executable, the linker tries to make sure a definition for the global variable exists. The linker finds out whether a global variable is defined in the executable or if the definition comes from one of the shared objects (libraries) provided with the link command.

When the linker sees that the global variable is defined in a shared object, the linker makes a copy of the global variable in the executable and creates a copy relocation instruction corresponding to the global variable. At run-time, the copy of the global variable in the executable will be used instead of the original definition in the shared object. The copy relocation that was created ensures that any initializations that occurred in the shared object for the global variable are reflected correctly in the copy contained in the executable binary.

Using this technique, the compiler knows for sure that every global variable will be defined by the executable and therefore does not add an extra memory load for obtaining each global variable's address. When the compiler is asked to generate position independent code for an executable, the compiler may not generate any extra memory loads for global variables. Instead, the compiler may generate code assuming that global variables are defined in the executable. Since the compiler does not add extra memory loads for global variables' addresses at compile time, this example technique then requires only one memory load per global variable to obtain global variable values instead of two.

Figure 4:
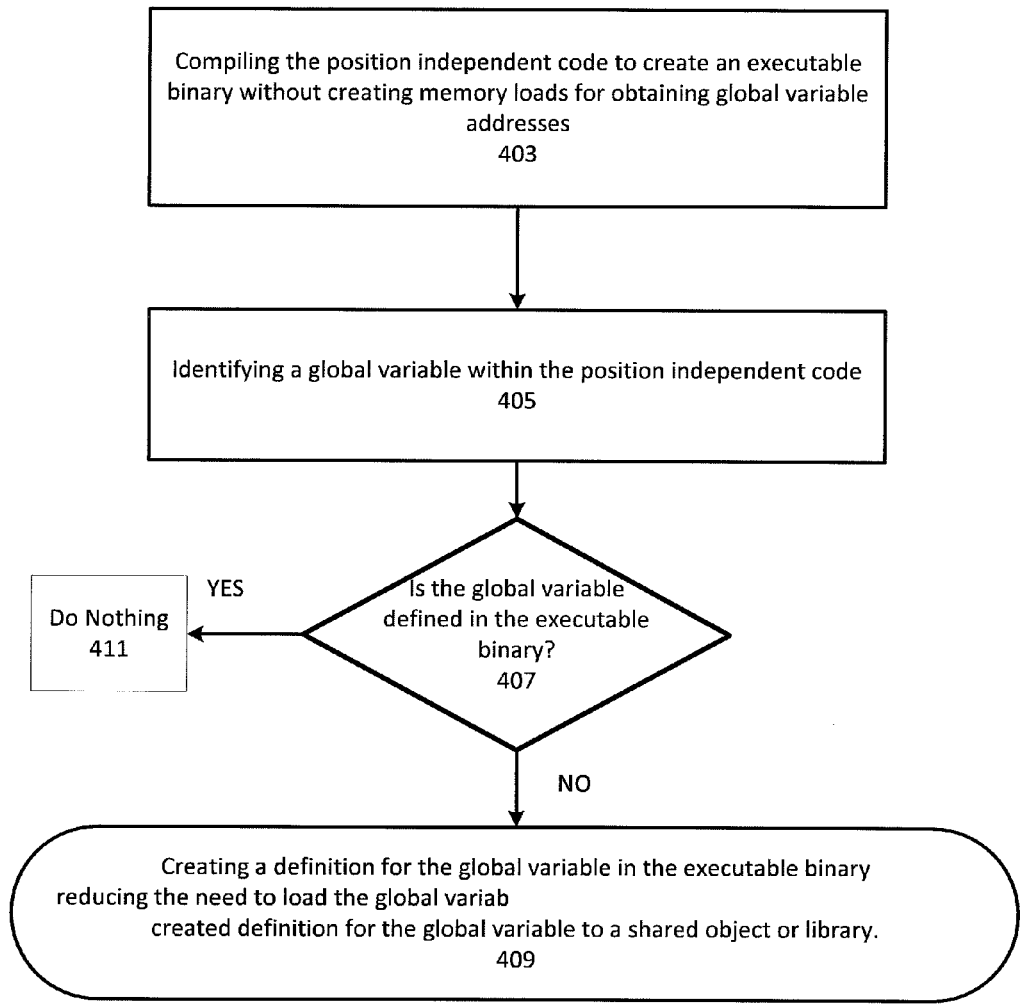
FIG. 4 is a flow diagram of a first embodiment of the invention for reducing the number of memory loads required to access global variables when creating executable binaries for position independent code.

An example method begins with compiling position independent code to create an executable binary without creating memory loads for obtaining global variable addresses as illustrated in FIG. 4 (403). A global variable may be identified within the position independent code (405) and it may be determined whether the global variable is defined in the executable binary (407). Whether the global variable is defined in the executable binary is dependent on which technique is used. When using the copy relocations technique, global variables will always be defined in the executable. If the global variable is not defined in the executable binary, a definition for the global variable may be created in the executable binary reducing the need to load the global variable's address from memory. The executable may have data sections that define various global variables. A definition may be created in the executable by reserving enough bytes of memory at the next available address offset, for example, 0xafbc, in the data section, to hold the entire size of the global variable in the data section. The global variable may be accessed using this address (offset). The executable's symbol table may then export this information regarding the global variable's offset address. The created definition for the global variable may then be provided to a shared object or library (409).

A second embodiment may include passing a list of defined global variables rather than defining the variables at compile time or link time. Many performance critical binaries and other binaries are compiled with feed-back directed optimization. Feedback-directed optimization (FDO) is a technique used to tune application executions based on application runtime behavior in order to improve performance. FDO is also known as Profile Guided Optimization (PGO) and Profile-Based Optimization (PBO). In order to tune applications, FDO conducts profiling on the applications. Profiling is the process of gathering information about how an application behaves during runtime. This profile information is used to drive decisions regarding various application optimizations.

Figure 5:
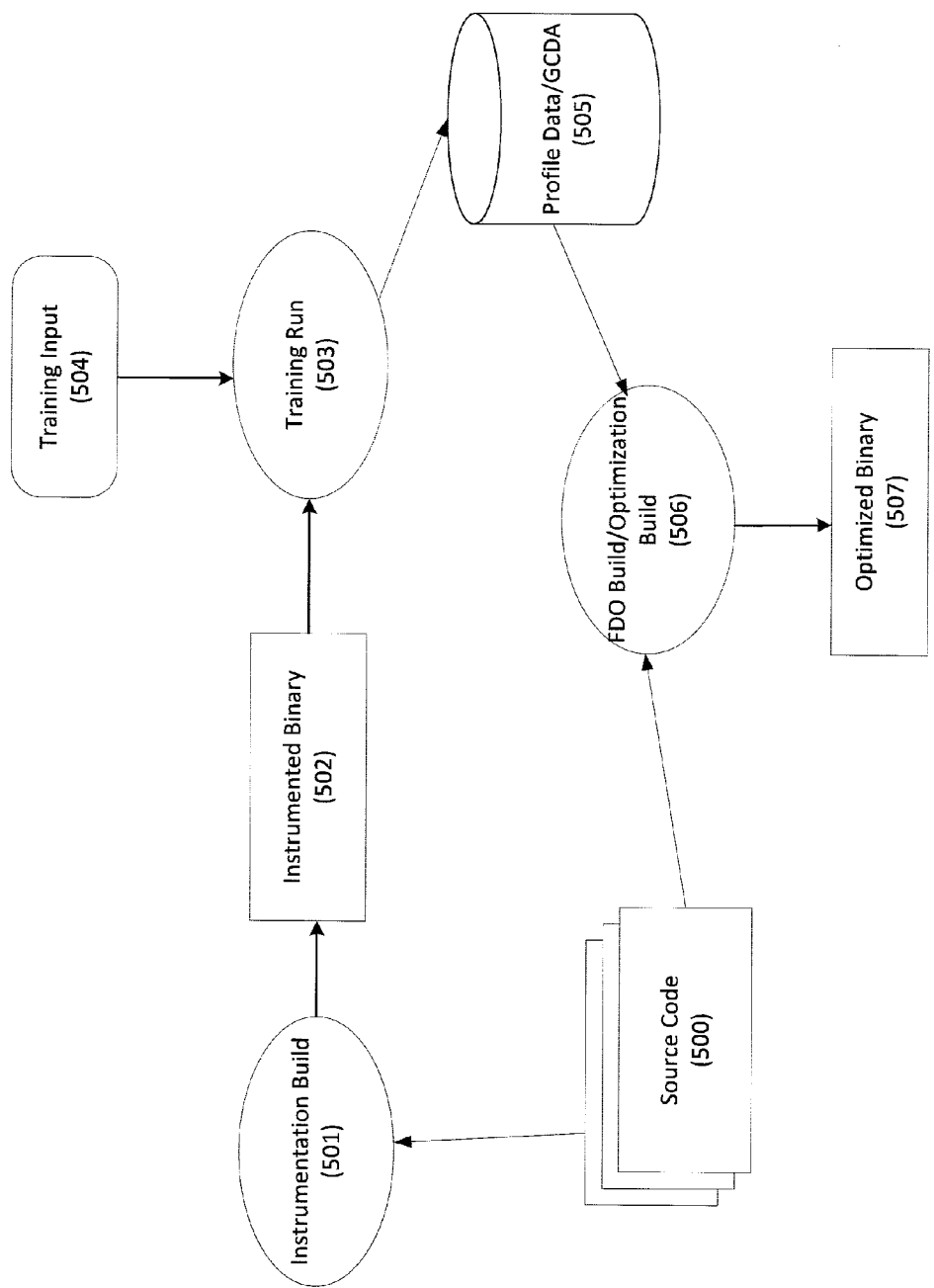
FIG. 5 is a block diagram illustrating a conventional feedback-directed optimization loop.

As illustrated in FIG. 5, customary feedback-directed optimization is a dual build model technique that uses static instrumentation to collect edge and value profiles. An instrumentation build (501) allows the compiler to insert code into an application's binary to create an instrumented version of the binary (502). This inserted code typically counts edges or collects value profiles. The instrumented binary (502) is run on a representative set of training data (504) in a training run (503). At the end of the training execution, all collected edge counts and value information is written and aggregated in a profile database or gcov data file (GCDA) (505). An optimization build (506) then occurs in which the compiler uses the generated profile to make optimization decisions such as inline decisions, instruction scheduling, basic block re-ordering, function splitting, and register allocation.

Since the instrumented and optimized binary are built from the same sources, the list of global variables that are defined in and outside of these two executables is the same. For this reason, the list of global variables that has been defined from the instrumented binary may be passed to the compiler building the optimized binary. The compiler then knows the list of global variables defined by the executable and may only need to generate the extra memory loads for global variables that are not on the defined list of variables.

Figure 6:
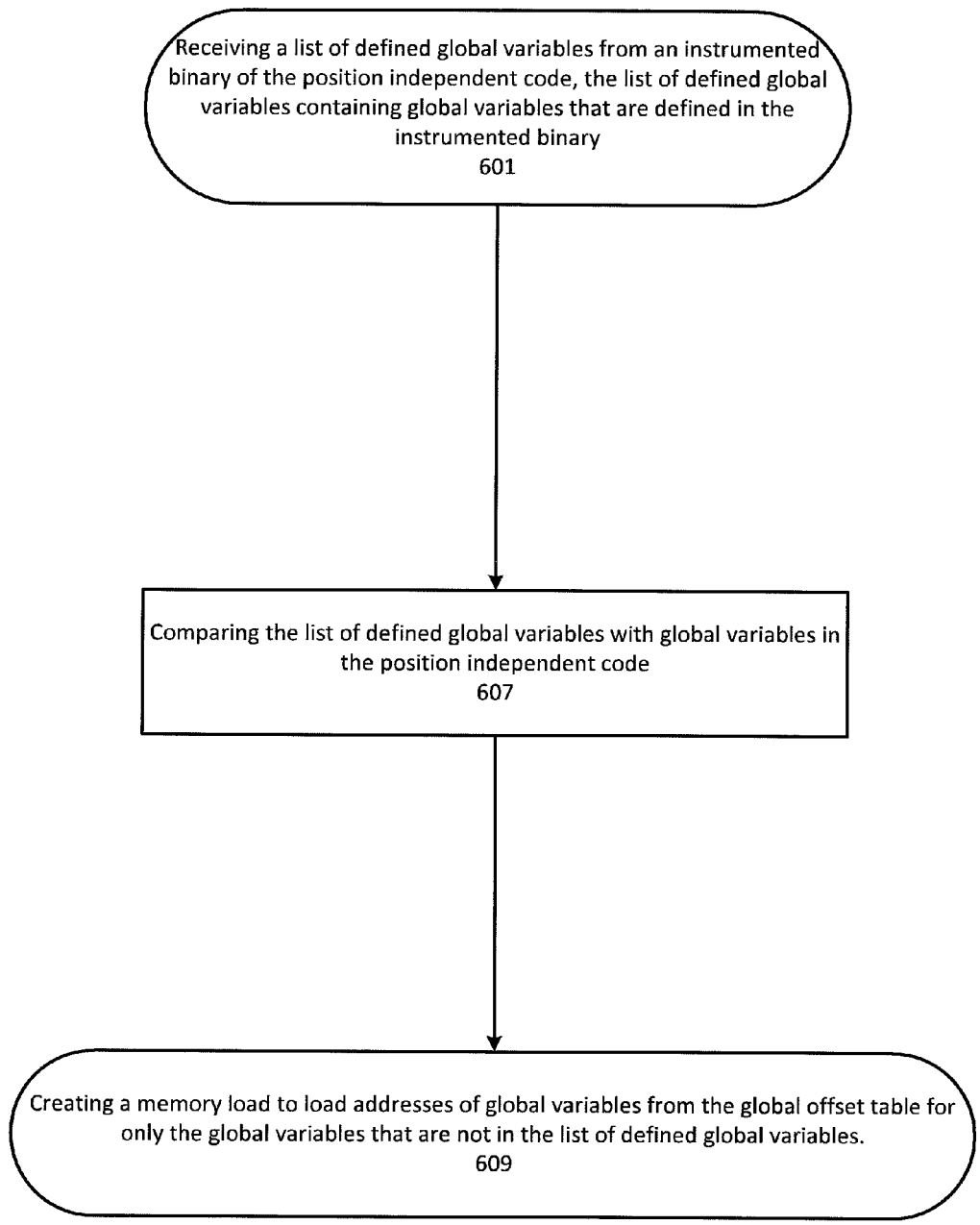
FIG. 6 is a flow diagram of a second embodiment for reducing the number of memory loads required to access global variables when creating executable binaries for position independent code.

An example method begins with receiving a list of defined global variables from an instrumented binary of the position independent code as illustrated in FIG. 6 (601). The list of defined global variables may contain global variables that are defined in the instrumented binary. The position independent code may then be compiled. During compilation, the list of defined global variables may be compared with global variables in the position independent code (607). Memory load instructions may be created to load addresses of global variables from the global offset table for the global variables that are not in the list of defined global variables (609). FIG. 7 illustrates an example code and a list of defined global variables from an instrumented binary of the position independent code. The list of variables from the instrumented binary may be passed to the optimized binary. As shown in FIG. 7, variables may be defined in the executable like "glob_a" and "glob_b" or they may be defined in a shared object like "glob_shared." GOT access may only need to be generated for global variables defined in shared objects.

Figure 8:
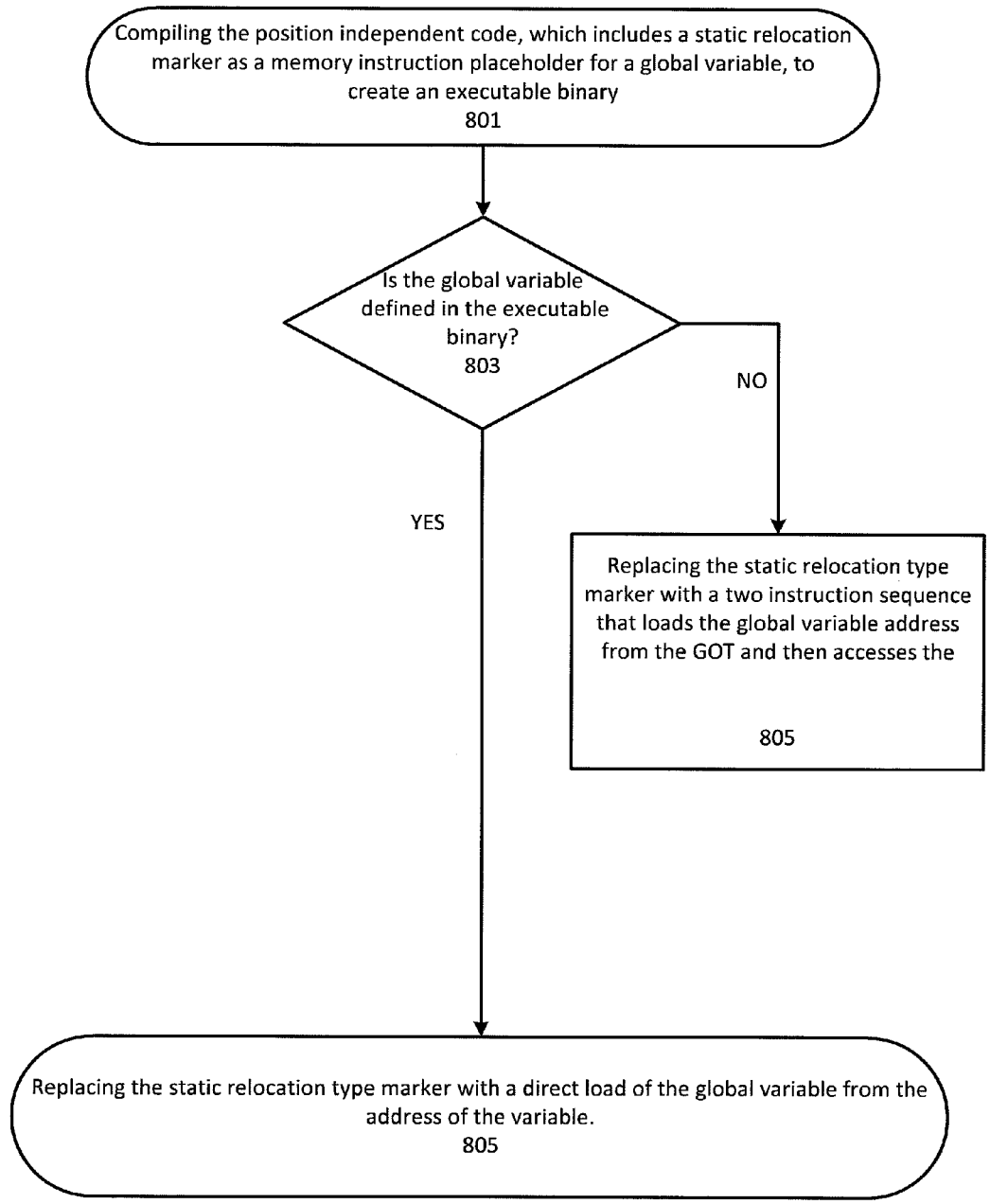
FIG. 8 is a flow diagram of a third embodiment for reducing the number of memory loads required to access global variable values when creating executable binaries for position independent code.

A third embodiment includes using a special relocation to mark global variables accesses and have the linker patch instructions appropriately when it processes the relocation based on whether a global variable is defined in the executable binary or in a shared object/library. An example method may begin with compiling position independent code, in which a static relocation type marker has been included as a memory instruction placeholder for a global variable, to create an executable binary as illustrated in FIG. 8 (801). A compiler may generate a special newly defined relocation for each instruction that references an external global variable that is not defined in the source module (or file) being compiled. An example special relocation may be defined so that, when the compiler tool encounters the instruction with this special relocation, the linker is instructed to fix the instructions. For every global variable access, the compiler may generate an instruction with the newly defined relocation to denote the access to a specific global variable. When the linker processes this relocation in an instruction accessing a global variable, the linker may determine where the global variable is defined (803). If the global variable is defined by the executable, the linker may replace the relocation to directly load the global variable from the address of the variable (805). If the global variable is defined in a shared object, the linker may replace the relocation instruction to call a two instruction sequence that loads the global variables address from the GOT and then accesses the global variable's value by loading from the global variable's address (805).

FIG. 9 illustrates an example of using this special relocation type. As shown in FIG. 8, there may be a source code file, foo.cc, that will be built into an executable. With the special relocation, the assembly code in foo.s before the linker is invoked may include a marker for the global variable "a_glob" (902). GLOBAL_ACCESS (a_glob) is the representation for the newly created relocation which the linker must process. This instruction says that the value of "a_glob" will ultimately be stored in register eax. At link time, there may be one of two situations, either the global variable "a_glob" is defined in the executable via another object file or "a_glob" is defined in a shared object. If the global variable is defined in the executable binary, the global access in the executable binary may become just one instruction (903). If the global variable is defined in a shared object, the global access in the executable may become two instructions (904)

Figure 10:
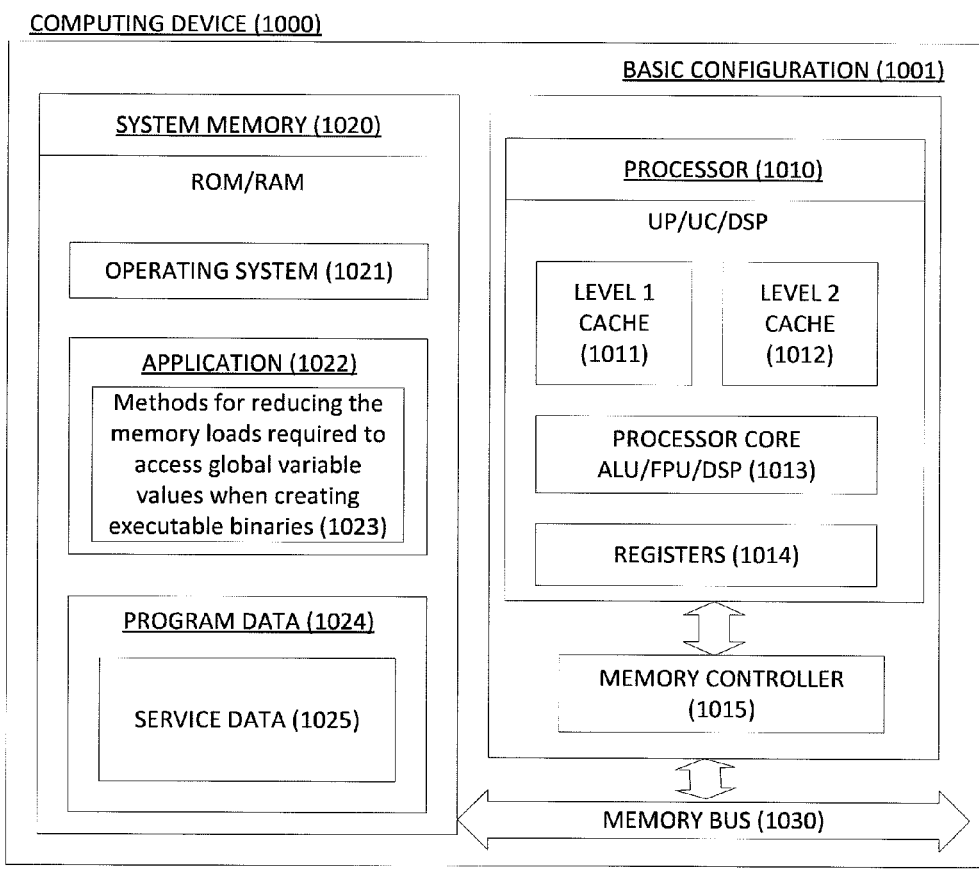
FIG. 10 is a block diagram illustrating an exemplary computing device.

FIG. 10 is a high-level block diagram of an example computer (1000) that is arranged for creating executable binaries. In a very basic configuration (1001), the computing device (1000) typically includes one or more processors (1010) and system memory (1020). A memory bus (1030) can be used for communicating between the processor (1010) and the system memory (1020).

Depending on the desired configuration, the processor (1010) can be of any type including but not limited to a microprocessor (µP), a microcontroller (µC), a digital signal processor (DSP), or any combination thereof. The processor (1010) can include one more levels of caching, such as a level one cache (1011) and a level two cache (1012), a processor core (1013), and registers (1014). The processor core (1013) can include an arithmetic logic unit (ALU), a floating point unit (FPU), a digital signal processing core (DSP Core), or any combination thereof. A memory controller (1016) can also be used with the processor (1010), or in some implementations the memory controller (1015) can be an internal part of the processor (1010).

Depending on the desired configuration, the system memory (1020) can be of any type including but not limited to volatile memory (such as RAM), non-volatile memory (such as ROM, flash memory, etc.) or any combination thereof. System memory (1020) typically includes an operating system (1021), one or more applications (1022), and program data (1024). The application (1022) may include a method for reducing the memory loads required to access global variables when creating executable binaries. Program Data (1024) includes storing instructions that, when executed by the one or more processing devices, implement a method for binary creation. (1023). In some embodiments, the application (1022) can be arranged to operate with program data (1024) on an operating system (1021).

The computing device (1000) can have additional features or functionality, and additional interfaces to facilitate communications between the basic configuration (1001) and any required devices and interfaces.

System memory (1020) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1000. Any such computer storage media can be part of the device (1000).

The computing device (1000) can be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that include any of the above functions. The computing device (1000) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), other integrated formats, or as a web service. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., fiber optics cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for reducing the number of memory loads required to access global variables when creating an executable binary for position independent code, the method comprising:
   compiling the position independent code to create an executable binary without creating memory load instructions for obtaining global variable addresses;
   identifying a global variable within the position independent code;
   determining whether the global variable is defined in the executable binary; and
   responsive to determining that the global variable is not defined in the executable binary:
      creating a definition for the global variable in the executable binary reducing the need to load the global variable's address from memory; and
      providing the created definition for the global variable to a shared object or library.

2. A computer-implemented method for reducing the number of memory loads required to access global variables when creating an executable binary for position independent code, the method comprising:
   receiving a list of defined global variables from an instrumented binary of the position independent code, the list of defined global variables containing global variables that are defined in the instrumented binary; and
   compiling the position independent code to create an executable binary by:
      comparing the list of defined global variables with global variables in the position independent code, and
      creating a memory load to load addresses of global variables from the global offset table for only the global variables that are not in the list of defined global variables.

3. A computer-implemented method for reducing the number of memory loads required to access global variable values when creating an executable binary for position independent code, the method comprising:
   compiling the position independent code, which includes a static relocation as a memory instruction placeholder for a global variable, to create an executable binary;
   determining whether the global variable is defined in the executable binary; and
   responsive to determining that the global variable is defined in the executable binary, replacing the static relocation with a load instruction to directly load the global variable from the address of the global variable.

4. The computer-implemented method of claim 3, wherein the load instruction is a JUMP instruction to jump to the memory load instruction that will load the global variable's content.

5. The computer-implemented method of claim 3, further comprising:
   responsive to determining that the global variable is not defined in the executable binary, replacing the static relocation with a two-instruction sequence that loads the address of the global variable from the global offset table and then accesses the global variable's value by loading from the global variable's address.

* * * * *